Dec. 17, 1968    C. V. BERGER    3,417,156
ENDOTHERMIC CATALYTIC CONVERSION OF ETHYLBENZENE TO STYRENE
Filed Sept. 23, 1966
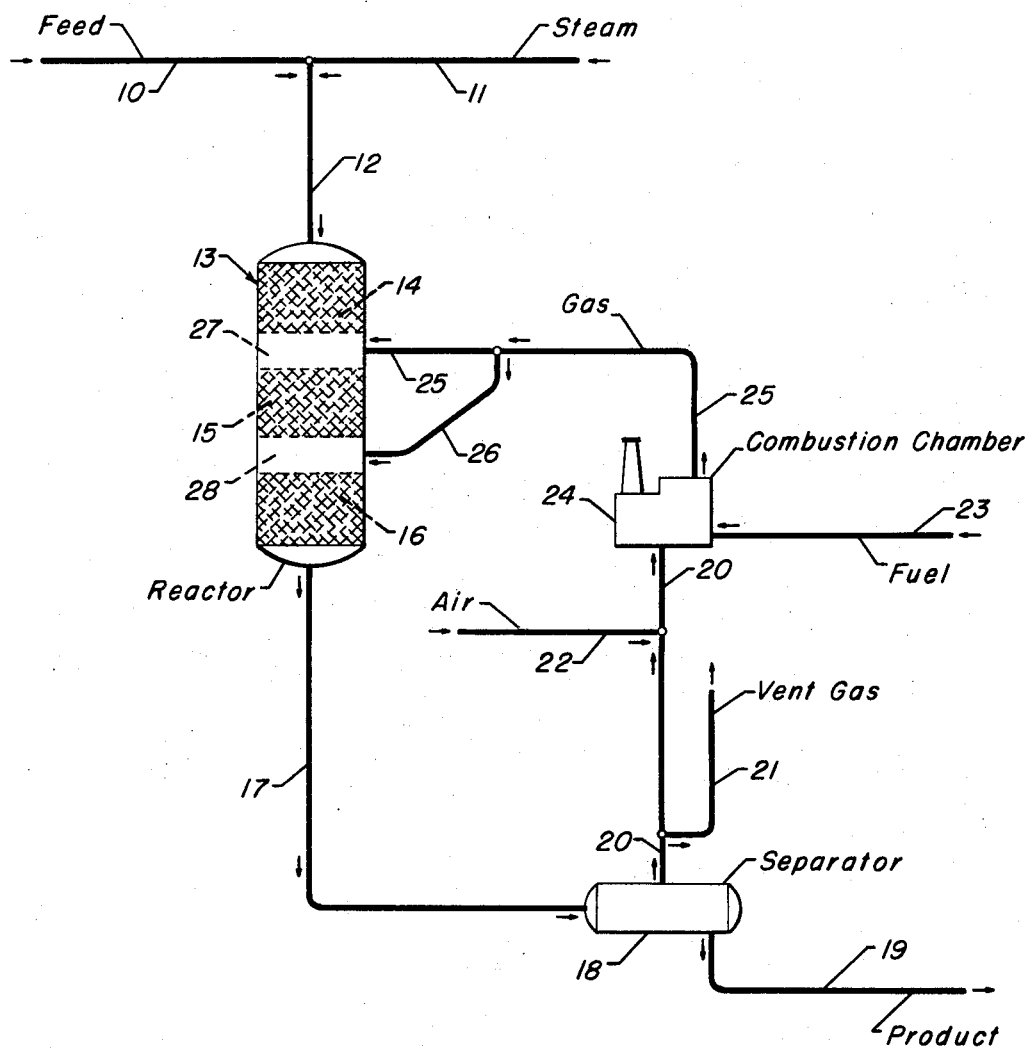
INVENTOR:
Charles V. Berger
BY: James R. Hootson, Jr.
Joseph E. Mason, Jr.
ATTORNEYS United States Patent Office  3,417,156
Patented Dec. 17, 1968

3,417,156
ENDOTHERMIC CATALYTIC CONVERSION OF ETHYLBENZENE TO STYRENE
Charles V. Berger, Western Springs, Ill., assignor to Universal Oil Products Company, Des Plaines, Ill., a corporation of Delaware
Filed Sept. 23, 1966, Ser. No. 581,542
6 Claims. (Cl. 260—669)

ABSTRACT OF THE DISCLOSURE

Styrene is prepared by the dehydrogenation of ethylbenzene in a plurality of catalytic reaction zones. A normally gaseous hydrocarbon fraction occurring as part of the reaction effluent is separated and burned. The combustion gases from the burning of the gaseous hydrocarbons is admixed with the effluent from at least one of the reaction zones to supply at least part of the heat required in the following reaction zone in the series.

---

This invention relates to the endothermic catalytic conversion of hydrocarbons. It particularly relates to a process for the conversion of hydrocarbons in a multiple bed conversion zone. It specifically relates to an improved process for the dehydrogenation of ethylbenzene to styrene under conditions of conversion temperature restoration. More specifically, this invention relates to a more economic catalytic method for obtaining increased yields of styrene through the steam dehydrogenation of ethylbenzene.

Basic methods are well known in the art for production of styrene from ethylbenzene. However, the prior art methods have achieved generally poor conversions of ethylbenzene to styrene per pass through the catalytic system. Typically, the prior art processes achieve a conversion of about 30% to 40%. The recovery of styrene in high concentration from such a process requires extensive distillation and apparatus in order to separate the styrene from the unreacted ethylbenzene and other reaction products. Usually, the ethylbenzene is recycled in large quantities thereby also necessitating increased sizing of reactor vessels. In short, when the conversion of ethylbenzene to styrene is only in the 30% range, it is extremely difficult to economically produce styrene in high concentration and high purity.

Those skilled in the art recognize the importance of being able to economically produce styrene since this chemical, otherwise called phenylethylene, is extensively employed throughout commerce as a raw material for the production of resins, plastics, and elastomers. Specifically, styrene is copolymerized with butadiene to produce high molecular weight synthetic rubber. Although styrene may be recovered in limited quantities from various coal tars and heavy crude oils, it is preferred to synthesize large quantities by the dehydrogenation of ethylbenzene. The raw material ethylbenzene can either be separated from petroleum fractions by superdistillation, or can be synthetically prepared, such as through the alkylation of benzene with ethylene.

The prior art methods for producing styrene are generally carried out by passing a mixture of ethylbenzene and steam over a fixed bed of dehydrogenation catalyst. In order to heat the reactants to reaction temperature, it is also general practice to admix the ethylbenzene which is at a temperature significantly below reaction temperature, with steam which has been superheated to a temperature above the reaction temperature, so that the mixture is at reaction temperature as it passes over the dehydrogenation catalyst. Since the basic chemical reaction involved, namely the dehydrogenation of ethylbenzene to styrene, is endothermic, there is a significant decrease in the reaction zone temperature as the reaction proceeds. It is not unusual in these prior art processes to witness a drop of perhaps 50° F. to 150° F. within the reaction zone or across a particular catalyst bed. Naturally, as the temperature decreases, the rapidity and efficiency of the reaction also decreases so that the overall efficiency of the process declines to a point where it would be economically unattractive unless processing schemes were found to overcome this disadvantage.

Again, the prior art attempted to solve this problem by drastically increasing the temperature of the superheated steam so that the difference between the inlet temperature of the reactants and the outlet temperature of the reaction products averaged generally the required reaction temperature. However, it was noted that at the instant the superheated steam is admixed with ethylbenzene, the ethylbenzene undergoes thermal decomposition, or cracking, through the pyrolytic reaction. In many instances such pyrolysis is effected to such a degree that the process becomes uneconomical due to the loss of ethylbenzene to carbon monoxide, carbon dioxide, polymeric materials, tars, etc. Another disadvantage is involved with the utility cost in raising the temperature of large quantities of steam to a level far above that required for effecting the dehydrogenation of ethylbenzene. Additionally, in spite of all these efforts to control the reaction, the conversion of ethylbenzene to styrene generally remains at approximately the 30% to 40% level.

More recently, however, the prior art has suggested means for increasing the level of conversion by utilizing various schemes for admixing the ethylbenzene and steam in such a way as to avoid the pyrolytic reaction. One of the prior art methods has been to split the steam into several portions whereby additional steam is added between catalytic zones in order to reheat the reactants to reaction temperature. In these latter processes conversions as high as 50% for ethylbenzene to styrene are alleged. However, these latter process schemes do not indicate the method by which the steam and the ethylbenzene are heated, with the result that the utility costs are still prohibitively high for the achievement of the increased conversion level.

Accordingly, it is an object of this invention to effect a more economic method of dehydrogenating ethylbenzene to produce styrene in high concentration.

It is also an object of this invention to provide a process for the endothermic catalytic conversion of hydrocarbons in a multiple adiabatic bed conversion zone under conditions of conversion temperature restoration.

It is another object of this invention to provide a process for the dehydrogenation of ethylbenzene to styrene characterized by a high conversion per pass of ethylbenzene to styrene.

It is a specific object of this invention to provide an improved method for heating the reactants to reaction temperature in a more economic and facile manner than has heretofore been possible.

In accordance with the present invention, a process for the endothermic catalytic conversion of hydrocarbons in a multiple bed conversion zone comprises passing hydrocarbons to be converted into said zone under conversion conditions; admixing the effluent from at least one catalyst bed with hereinafter specified heating gas; passing said admixture into the next succeeding catalyst bed of said zone under conversion conditions; removing from said zone a total effluent stream comprising normally liquid converted hydrocarbons, normally liquid unconverted hydrocarbons, and normally gaseous hydrocarbons; separating said liquid hydrocarbons from said gaseous hydrocarbons; burning at least a portion of said gaseous hydrocarbons with an oxygen-containing gas in a combustion zone under conditions sufficient to produce heating gas of low oxygen content at a temperature of at least conversion temperature; and, introducing heating gas into said effluent as specified.

Another embodiment of this invention includes a process for the dehydrogenation of alkylaromatic hydrocarbons, and specifically embodies the dehydrogenation of ethylbenzene to styrene.

A particular embodiment of this invention is a process for producing styrene in high concentration via the catalytic dehydrogenation of ethylbenzene in a multi-bed reaction zone which comprises the steps of (a) passing a mixture of ethylbenzene and steam into a first catalyst bed of said zone at a conversion temperature from 1000° F. to 1400° F. sufficient to convert ethylbenzene to styrene; (b) removing an effluent from said first bed at a temperature below said conversion temperature; (c) introducing hereinafter specified heating gas into said effluent under conditions sufficient to produce feed to a second catalyst bed at a temperature from 1000° F. to 1400° F. sufficient to convert ethylbenzene to styrene; (d) dehydrogenating ethylbenzene in said feed to styrene in said second bed in the presence of said heating gas; (e) removing from said zone a total effluent stream comprising styrene, ethylbenzene, and gaseous hydrocarbons; (f) separating the gaseous hydrocarbons from the styrene and ethylbenzene; (g) burning separated gaseous hydrocarbons in a combustion zone to produce said specified heating gas containing less than 0.2% by volume oxygen at a temperature above said conversion temperature; and (h) recovering styrene in high concentration.

The advantages of the inventive process will be more clearly understood with reference to the attached drawing which is a schematic representation of the process flow illustrative of the invention.

With reference now to the attached drawing, ethylbenzene enters the process through line 10 being also admixed with recycle ethylbenzene from means not shown. Typically, the ethylbenzene stream is at a temperature of about 100° F. In order to facilitate the vaporization of the ethylbenzene and to provide sufficient heat for the reaction, steam is added to the ethylbenzene feed stream from line 11 and the admixture of ethylbenzene and steam is passed into catalytic reaction zone 13 via line 12.

Reaction zone 13 comprises, for example, three fixed beds of catalyst for effecting the dehydrogenation reaction. The catalyst employed is preferably an alkali-promoted iron catalyst. Typically, such a catalyst may consist of 85% by weight ferrous oxide, 2% by weight chromia, 12% by weight of potassium hydroxide, and 1% by weight of sodium hydroxide. Other catalyst compositions include 90% by weight iron oxide, 4% by weight chromia, and 6% by weight potassium carbonate. While these known commercial dehydrogenation catalysts are preferred, other known catalysts may be used including those comprising ferrous oxide-potassium oxide, other metal oxides and/or sulfides, including those of calcium, lithium, strontium, magnesium, beryllium, zirconium, tungsten, molybdenum, titanium, hafnium, vanadium, aluminum, chromium, copper, and mixtures of two or more including chromia-alumina, alumina-titania, alumina-vanadia, etc. Similarly, the various methods of preparing the aforesaid catalysts are well known within the prior art.

The admixture of steam and ethylbenzene passes from line 12 into the first catalyst bed 14 disposed therein. The reactants enter the catalyst bed at a temperature from 1000° F. to 1400° F., typically at a temperature of about 1125° F., sufficient to convert ethylbenzene to styrene. The conditions in the first catalyst bed include not only the catalyst and temperatures as described above, but also include the weight hourly space velocity. The space velocity as used herein is defined as pounds of ethylbenzene charged per hour per pound of catalyst disposed in reactor 13. Typically, the weight hourly space velocity is within the range of about 0.1 to 2.0, and preferably within the range of about 0.2 to about 1.5. The space velocity at any given time is correlated with a selected inlet temperature to result in a reactor product effluent having a temperature within the range of about 1000° F. to 1400° F., typically 1065° F.

The amount of catalyst contained in each catalyst bed may be varied considerably. Typically, the bed depth may range from 2 feet to 6 feet, the lower range being preferred to minimize pressure drop.

The reactor pressure may also be varied over a considerable range, as long as sufficient diluting steam or heating gas is present to hold the partial pressure of the hydrocarbons at a low level, e.g., below atmospheric pressure. Sufficient pressure must be maintained at the reactor inlet to overcome the pressure drop through the multiple beds of catalyst contained in the reactor vessels, or in separate vessels if each such bed is contained in a separate reactor. Either multiple beds contained in a single reactor, or single beds in multiple reactors, or mixtures of these arrangements may be used in the practice of this invention.

As the reactants in line 12 contact the catalyst contained in the first catalyst bed 14 in reactor 13, there is a temperature decrease observed across the catalyst bed due to the endothermic nature of the reaction. Without additional heat having been added, the temperature in space 27 of the effluent leaving the first catalyst bed would be in the order of 50° F. to 150° F. or more, less than the inlet temperature selected for the material in line 12. Therefore, a portion of hereinafter specified heating gas is added to the effluent in space 27 via line 25. The production of this heating gas will be more fully described hereinafter. Usually, this heating gas is at a temperature at least as high as the desired conversion temperature for the next cataylst bed, but preferably is in excess of 100° F. more than the desired conversion temperature in order to reduce the required quantity of gas.

The admixing formed in void space 27 creates a second feed mixture which is, preferably, at a temperature substantially the same as the reactor temperature specified hereinabove. The heated second feed mixture is then contacted with the preferred dehydrogenation catalyst in a second bed 15 contained in reactor 13 under conditions sufficient to convert additional ethylbenzene present therein to styrene.

The effluent from catalyst bed 15 in void space 28 is similarly of a reduced temperature. Therefore, another portion of hereinafter specified heating gas is passed into void space 28 via line 26 in order to reheat or restore the reactants in void space 28 to the desired conversion temperature for the next succeeding catalyst bed 16. Similarly, additional ethylbenzene is dehydrogenated in catalyst bed 16 in the presence of the heating gas which has been added both via line 25 and line 26. As the total effluent leaves reactor 13 via line 17, there is an overall conversion of ethylbenzene to styrene of at least 50%, and, typically, may be 65%. This total effluent in line 17 contains styrene, unconverted ethylbenzene, gaseous products including hydrocarbons and hydrogen which have been produced during the dehydrogenation reaction, and heating gas. This total effluent is passed into separator 18 wherein the liquid hydrocarbons, e.g., styrene, ethylbenzene, and by-product liquids, especially benzene and toluene, are removed from the process via line 19 for separation and recovery of the styrene. If desired, the so-separated ethylbenzene may be recyled to the process with the feed in line 10 as mentioned hereinabove.

The normally gaseous products which have been separated in separator 18 are passed via line 20 into combustion chamber 24 for burning therein. To minimize liquid hydrocarbon losses, it may be desirable to compress these gaseous products and to absorb the trace amounts of aromatics contained therein before combustion. Sufficient air, or other oxygen-containing gas, is admixed with the gases via line 22 in order for the burning to take place and conditions are chosen therein such that the heating gas produced is of very low oxygen content. If desired, additional fuel may be added to the combustion chamber via line 23, but generally this is not necessary. If the combustion oxygen is diluted with steam, then the introduction of inerts such as nitrogen is minimized. Usually, however, air is used as the oxygen source and, accordingly, gas may be vented from the process via line 21 to prevent a buildup of inerts in the system.

The operating conditions for the combustion zone are chosen such that the gas leaving the chamber is considered substantially oxygen free. Generally, this will be at an oxygen content of 0.2% by volume or less. Typically, the oxygen content will be less than 0.1%. The temperature of the heating gas produced in combustion chamber 24 may vary from 1500° F. to 3500° F., depending upon the kind of conditions chosen for the combustion chamber. If air is used as the oxygen-containing gas, the temperature of the heating gas in line 25 may be considerably higher than desired and could be as high as 3500° F. Suitable coolers and/or quenching mediums may be added to the gas in line 25 in order to control its temperature such that when the desired ratio of heating gas to bed effluent is employed the desired conversion temperature for the next catalyst bed is attained. It is important not to overheat the gas so that pyrolytic decomposition of ethylbenzene may not take place in void space 27 and 28 upon initial contact with heating gas. The gas in line 25 of low oxygen content is introduced into void spaces 27 and 28 as hereinabove specified for reheating of the reactants to the proper desired conversion temperature.

Usually the amount of steam used in admixture with the feed for the dehydrogenation of ethylbenzene to styrene may vary from about 1.0 pound per pound to about 20 pounds of steam per pound of ethylbenzene. Typically, the amount of steam and ethylbenzene are in proportion of about 2.8 pounds of steam per pound of ethylbenzene.

Although the persent invention has been described with reference to the appended drawing and to the reaction of the dehydrogenating of ethylbenzene to styrene, it is to be noted that the process of the present invention is equally applicable broadly to the endothermic catalytic conversion of hydrocarbons. It is particularly applicable, however, to the dehydrogenation of alkylated aromatic hydrocarbons, such as ethylbenzene, isopropylbenzene, diethylbenzene, ethylnaphthalene, and ethylchlorobenzene.

While the invention thus far has been described utilizing a reactor having three catalyst beds disposed therein, it will be realized that a minimum of two catalyst beds may be employed, but it is preferable to employ at least three catalyst beds and, in some instances, as many as five or more catalyst beds may be used to advantage.

It is also within the scope of this invention to use a combination of means to provide the reheating necessary to overcome the endothermic nature of the reaction. For example, the invention has beend described by using heating gas entirely as a means for supplying the reheat necessary. However, it is intended to include the use of steam injection within the void spaces between the beds, or electrical heating means in combination with the heating gas to provide the necessary heat for reaction.

The following example is given for the purpose of further illustrating the invention and specifically refers to a process for effecting the dehydrogenation of ethylbenzene to styrene. As previously stated in regard with the description of the accompanying drawing, it is not intended to limit unduly the present invention as to operating conditions, concentration of reactants, and/or to the catalyst employed.

EXAMPLE

This example is indicative of a commercial unit which processes approximately 470 barrels of fresh ethylbenzene charge per day. The processing unit is a fixed bed catalytic reaction zone comprising three beds in a single vessel containing commercial iron oxide dehydrogenation catalyst. The weight hourly space velocity for the process is 0.35 pound of ethylbenzene per hour per pound of catalyst disposed within the reaction zone, the latter being maintained under a pressure of 12.0 pounds per square inch gauge and the desired inlet temperature thereto is 1100° F.

On a mols per hour basis, 56.0 mols of charge stock containing about 55.2 mols of ethylbenzene in addition to minor quantities of benzene and toluene, is combined with about 37.0 mols of recycle ethylbenzene containing about 1.6 mols of styrene and about 0.9 mol of benzene and toluene. Of the total amount, about 5950 pounds of fresh ethylbenzene is charged to the process. The total charge stream, including the recycle ethylbenzene, is admixed with about 3900 pounds of steam to vaporize the ethylbenzene and to raise the temperature of the mixture to approximately 325° F. The temperature of the mixture is further increased to conversion temperature by heat exchange with the dehydrogenation reaction effluent and/or by direct fired heaters. Additional superheated steam, amounting to about 7300 pounds, is added and the total ethylbenzene-steam mixture is then passed into the reaction zone at a temperature of approximately 1100° F. wherein ethylbenzene is dehydrogenated to styrene.

The effluent from the first catalyst bed is at a temperature of approximately 1000° F. and hereinafter specified heating gas is added to the effluent leaving the first reaction zone such that the temperature is raised again to 1100° F. prior to its introduction into the second catalyst bed. This procedure is repeated until the entire hydrocarbons have passed through the three beds. The reaction product effluent, after imparting heat to the feed, is at a temperature in excess of about 500° F., is then subjected to a rapid water quench to decrease the temperature to about 220° F., and is subsequently cooled to a suitable liquid-vapor separation temperature of about 100° F. This procedure effectively inhibits the formation of styrene polymer otherwise forming when the product effluent is cooled slowly from 500° F. to the temperature of separation.

The cooled product effluent is passed into a suitable separation zone where the dry gas produced in the process is removed and the water is separated from the normally liquid hydrocarbon products. The dry gas at this point is passed into a combustion zone with air wherein it is burned to produce a heating gas product at a temperature of 2200° F. with an oxygen content of approximately 0.1% by weight. The heating gas is then cooled by direct quenching with water to a temperature of approximately 1500° F. and thence into the void spaces between the catalyst zones as hereinabove specified for reheating of the respective effluents from the catalyst beds. Styrene in high concentration is separated from the hydrocarbon reaction products and the unconverted ethylbenzene is preferably recycled to the process in admixture with the feed as previously mentioned.

The operation of the present invention accomplishes considerable economies of operation over the prior art processes. It was discovered that the heating gas could be formed by the combustion of the gases separated from the reaction effluent in a more facile manner than additional quantities of steam could be superheated as practiced by the prior art. The overall utilization of the hydrocarbon feed is more efficient since the gases separated from the reaction effluent are otherwise lost or must be burned as fuel in other operations not associated with the reaction. The inventive process accordingly is more self-supporting than those of the prior art. In addition to this advantage, the inventive process converts ethylbenzene to styrene at conversion levels above 50%, typically in the range of 60% to 70%, which is a considerable advance over the prior art processes.

As used herein, the term "gaseous hydrocarbons" is intended to include normally gaseous hydrocarbons such as methane, ethane, propane, etc., and to include hydrogen.

The invention claimed:
1. Process for the endothermic catalytic conversion of ethylbenzene to styrene in a multiple bed conversion zone which comprises passing ethylbenzene to be converted into said zone under conversion conditions; admixing the effluent from at least one catalyst bed with hereinafter specified heating gas; passing said admixture into the next succeeding catalyst bed of said zone under conversion conditions; removing from said zone a total effluent stream comprising normally liquid styrene, normally liquid unconverted ethylbenzene, and normally gaseous hydrocarbons; separating said normally liquid hydrocarbons from said gaseous hydrocarbons; burning at least a portion of said gaseous hydrocarbons with an oxygen-containing gas in a combustion zone under conditions sufficient to produce heating gas of low oxygen content at a temperature of at least conversion temperature; and, introducing heating gas into said effluent as specified.

2. Process according to claim 1 wherein said conversion conditions include a temperature from 1000° F. to 1400° F.

3. Process for producing styrene in high concentration via the catalytic dehydrogenation of ethylbenzene in a multi-bed reaction zone which comprises the steps of:
   (a) passing a mixture of ethylbenzene and steam into a first catalyst bed of said zone at a conversion temperature from 1000° F. to 1400° F. sufficient to convert ethylbenzene to styrene;
   (b) removing an effluent from said first bed at a temperature below said conversion temperature;
   (c) introducing hereinafter specified heating gas into said effluent under conditions sufficient to produce feed to a second catalyst bed at a temperature from 1000° F. to 1400° F. sufficient to convert ethylbenzene to styrene;
   (d) dehydrogenating ethylbenzene in said feed to styrene in said second bed in the presence of said heating gas;
   (e) removing from said zone a total effluent stream comprising styrene, ethylbenzene, and gaseous hydrocarbons;
   (f) separating the gaseous hydrocarbons from the styrene and ethylbenzene;
   (g) burning separated gaseous hydrocarbons in a combustion zone to produce said specified heating gas containing less than 0.2% by volume oxygen at a temperature above said conversion temperature; and,
   (h) recovering styrene in high concentration.

4. Process according to claim 3 wherein said temperature of the heating gas is at least 100° F. above said conversion temperature.

5. Process according to claim 3 wherein said reaction zone comprises at least 3 catalyst beds.

6. Process according to claim 5 wherein said steam is mixed with ethylbenene in an amount from 1.0 pound to 20 pounds of steam per pound of ethylbenzene.

References Cited
UNITED STATES PATENTS

| | | | |
|---|---|---|---|
| 2,412,096 | 12/1946 | Odell | 260—669 |
| 2,851,502 | 9/1958 | Bowman et al. | 260—669 |
| 3,118,006 | 1/1964 | Lovett et al. | 260—669 |
| 3,330,878 | 7/1967 | Huckins et al. | 260—669 |

DELBERT E. GANTZ, *Primary Examiner.*

CURTIS R. DAVIS, *Assistant Examiner.*